United States Patent [19]

Carter

[11] Patent Number: 4,836,826
[45] Date of Patent: Jun. 6, 1989

[54] MAGNETIC DRIVE COUPLING

[75] Inventor: Edward L. Carter, Houston, Tex.

[73] Assignee: The United States of America as represented by the Administrator of the National Aeronautics and Space Administration, Washington, D.C.

[21] Appl. No.: 135,120

[22] Filed: Dec. 18, 1987

[51] Int. Cl.[4] .............................................. F16D 27/00
[52] U.S. Cl. ....................................... 464/29; 366/274
[58] Field of Search ................ 310/103, 105; 366/273, 366/274; 464/29

[56] References Cited

U.S. PATENT DOCUMENTS

| | | | |
|---|---|---|---|
| 2,638,558 | 5/1953 | Rankin | 310/104 |
| 2,768,316 | 10/1956 | Neiss | 464/29 X |
| 3,011,842 | 12/1961 | Norris. | |
| 3,378,710 | 4/1968 | Martin, Jr. | 310/104 |
| 3,382,386 | 5/1968 | Schlaeppi | 310/104 |
| 3,433,465 | 3/1969 | Szpur. | |
| 3,570,819 | 3/1971 | Rosinger. | |
| 4,115,040 | 9/1978 | Knorr | 464/29 X |
| 4,209,259 | 6/1980 | Rains et al. | 366/273 |
| 4,498,785 | 2/1985 | deBruyne | 366/274 |

FOREIGN PATENT DOCUMENTS 2709365 9/1977 Fed. Rep. of Germany.

Primary Examiner—Daniel P. Stodola
Attorney, Agent, or Firm—Russell E. Schlorff; John R. Manning; Edward K. Fein

[57] ABSTRACT

The driving (30) and driven (32) members of a magnetic drive (20) are separated by an enlarged gap (35) to provide clearance for a conduit (23) or other member. Flux pins (40) in the gap (35) maintain the torque transmitting capability of the drive (20). The spacing between two of the flux pins is increased to provide space for the conduit (23).

16 Claims, 2 Drawing Sheets

U.S. Patent    Jun. 6, 1989    Sheet 1 of 2    4,836,826
FIG.1
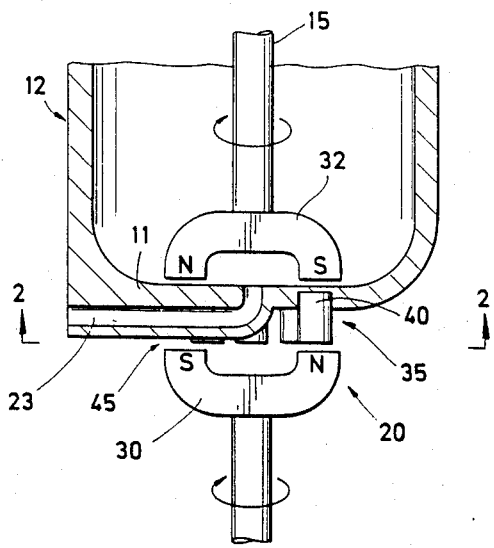
FIG.3
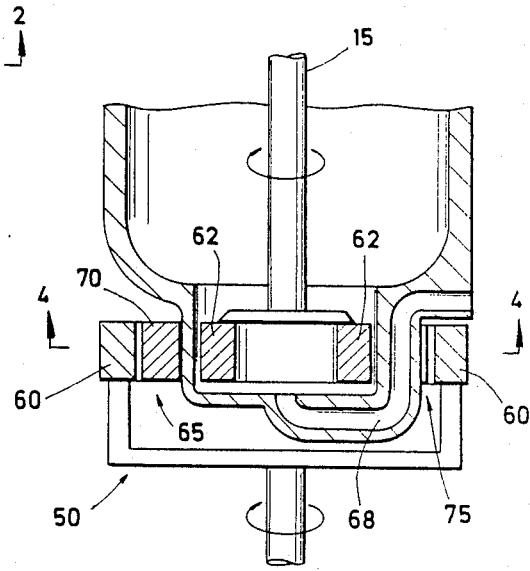
FIG.2
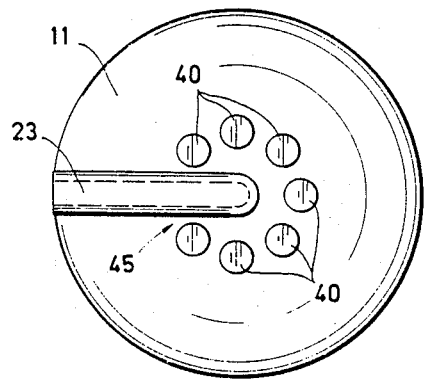
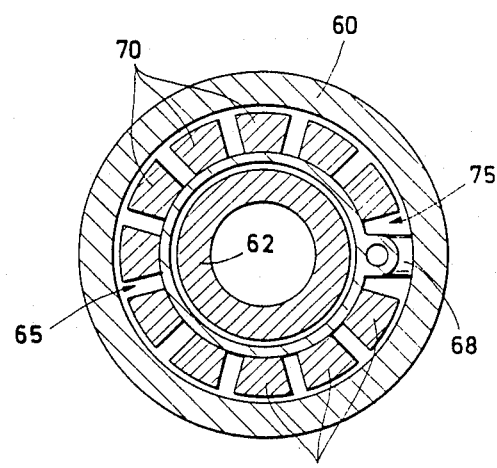
FIG.4

MAGNETIC DRIVE COUPLING

ORIGIN OF THE INVENTION

The invention described herein was made in the performance of work under a NASA contract and is subject to the provisions of Section 305 of the National Aeronautics and Space Act of 1958, Public Law 85-569 (72 Stat. 435; 42 U.S.C. 2457).

BACKGROUND OF THE INVENTION

The present invention relates to magnetic drive couplings, and more particularly to couplings which can accommodate and provide for passing gas lines, fluid tubes, electrical wires, or other conduits or members therethrough.

Critical component positioning requirements can sometimes cause a conflict between those components and a magnetic drive associated therewith. For example, in a biological reactor vessel having an internal magnetically driven mixer, it may be necessary to have a fluid conduit enter the vessel on the axis of rotation of the internal parts. In such a case, the external magnetic drive may have to be spaced a considerable distance from the vessel wall. However, the large air gap caused by spacing the drive at this distance means there will be significant flux leakage in the magnetic coupling. The torque transmission capability of the magnetic drive can accordingly be drastically reduced.

Many prior art magnetic drive mechanisms have driving and driven members which are separated by a gap. Some of these are provided with magnetic coupling elements which conduct some of the magnetic flux.

U.S. Pat. No. 2,638,558 (Rankin, issued May 12, 1953) shows a stationary stainless steel sheet 19 between drive magnets 24 and driven magnets 27. Means are provided for directing a flow of cooling fluid to the steel sheet 19 to overcome eddy current induced heating caused by the movement of the magnets.

U.S. Pat. No. 2,768,316 (Neiss, issued Oct. 23, 1956) shows circular arrays of magnets on driving and driven members.

U.S. Pat. No. 3,011,842 (Norris, issued Dec. 5, 1961) shows magnetic bearing rings separated by steel balls. The steel balls are kept evenly spaced by the effects of the magnets.

U.S. Pat. No. 3,378,710 (Martin, Jr., issued Apr. 16, 1968) shows (FIG. 17) driven pole pieces 109 and spacers 108 between stationary magnets 97 and moving magnets 112. The configuration of FIG. 18 shows stationary magnetizable radial bars 119 between rotating magnets.

U.S. Pat. No. 3,382,386 (Schlaeppi, issued May 7, 1968) discloses stationary soft magnetic coupling elements 3-6.

U.S. Pat. No. 3,433,465 (Szpur, issued Mar. 18, 1969) shows (FIGS. 2, 4, 9, 10, and 12) flux concentrating shoes 62, 147, and 194. (See col. 3, lines 21-34.)

U.S. Pat. No. 3,570,819 (Rosinger, issued Mar. 16, 1971) shows (FIG. 21) a dual stirring arrangement in which a magnet 182, which stirs liquid in an outer vessel, is located between a driving magnet 183 and another driven magnet 186.

U.S. Pat. No. 4,209,259 (Rains et al., issued June 24, 1980) discloses (FIGS. 1, 4, and 5) a high power, high torque apparatus using circular magnet arrays.

U.S. Pat. No. 4,498,785 (de Bruyne, issued Feb. 12, 1985) shows a magnetic stirrer in a bioreactor-type apparatus (see cols. 1 and 2).

German Offenlegungsschrift No.27 09 365 (Wik, published Sept. 15, 1977) shows (FIG. 5) mu-metal discs $P_1$, $P_2$ for concentrating flux between drive and stirring magnets.

Nowhere, however, do these patents teach or suggest a magnetic drive which provides clearance for a fluid conduit or other essential component without causing appreciable loss of the torque transmission capability of the coupling.

A need therefore remains for a means for extending the usefulness of magnetic drive couplings when relatively large gaps have to be tolerated because of other constraints. Ideally, such a means will be especially effective at reducing the reluctance of such a gap, concentrating the magnetic flux in the interface between the driving and driven members of the magnetic drive, reducing the torque diminishing effect of such a gap, and enhancing the torque transmitting capability of the magnetic drive coupling.

SUMMARY OF THE INVENTION

Briefly, the present invention meets the above needs and purposes with a new and improved magnetic drive coupling having clearance for a fluid conduit or other essential component, but which does not suffer an appreciable loss of torque transmission capability. The driving and driven magnetic members are separated by a larger than usual gap, but without significant flux leakage. Instead, flux pins of soft magnetic material are inserted in the enlarged gap, significantly increasing the transmitted torque. To provide clearance through the magnetic drive coupling, the spacing between two of the pins is increased as necessary, thereby forming a passageway in the gap between the magnetic drive members for passing components therethrough.

In a preferred embodiment, the magnetic drive coupling of the present invention includes a rotatable driving magnetic member and a rotatable driven magnetic member. The driven magnetic member may be substantially axially aligned opposite said driving member to form a face drive therewith, or may be a co-planar radial drive in which the magnetic members are positioned radially opposite one another. In both cases the driven member is rotatable on substantially the same axis as the driving member and is located substantially adjacent the driving member for magnetically and drivingly coupling therewith. According to the present invention, both of the magnetic members are also separated by a predetermined axial (face drive) or radial (radial drive) gap which is substantially larger than usual for magnetic drives.

A plurality of flux pins made of soft magnetic material is located in the gap between the driving and driven magnetic members. The flux pins reduce the reluctance of the gap, concentrate the magnetic flux in the interface between the members, reduce the torque diminishing effect of the gap, and enhance the torque transmitting capability of the coupling.

The spacing between two of the pins, however, is increased or enlarged. This provides a clearance space between these pins, thereby creating a passageway in the gap for passing components, such as a fluid conduit, therethrough.

In the preferred embodiment, a non-magnetic solid material separates and fixes the flux pins in stationary positions in the gap. The material between the pins is non-magnetic so that the flux will not be shunted, which would otherwise defeat operaton of the drive coupling.

It is therefore an object of the present invention to provide an improved magnetic drive coupling and method; such a coupling and method in which components, such as fluid conduits, wires, and so forth, may be readily passed through the coupling without significant loss of the torque transmission capabilities thereof; which includes a rotatable driving magnetic member, a driven magnetic member rotatable on substantially the same axis as the driving member, the driven magnetic member being located substantially adjacent the driving member for magnetically and drivingly coupling therewith; in which the magnetic members are separated by a predetermined gap therebetween; in which a plurality of flux pins is located in the gap between the driving and driven magnetic members to reduce the reluctance of the gap, concentrate the magnetic flux in the interface between the members, reduce the torque diminishing effect of the gap, and enhance the torque transmitting capability of the coupling; which includes at least one clearance space between at least two of the flux pins to provide a passageway in the gap for passing components therethrough; and to accomplish the above objects and purposes in an inexpensive, uncomplicated, durable, versatile, and reliable method and apparatus, inexpensive to manufacture, and readily suited to the widest possible utilization in magnetic drive applications.

These and other objects and advantages of the invention will be apparent from the following description, the accompanying drawings, and the appended claims.

BRIEF DESCRIPTION OF THE DRAWINGS

FIG. 1 is a somewhat figurative cross-sectional illustration showing a face type magnetic coupling according to the present invention;

FIG. 2 is a cross-sectional view taken on line 2—2 in FIG. 1;

FIG. 3 is an illustration similar to FIG. 1 showing a radial type magnetic coupling;

FIG. 4 is a cross-sectional view taken on line 4—4 in FIG. 3; and

DESCRIPTION OF THE PREFERRED EMBODIMENTS

Figure 5:
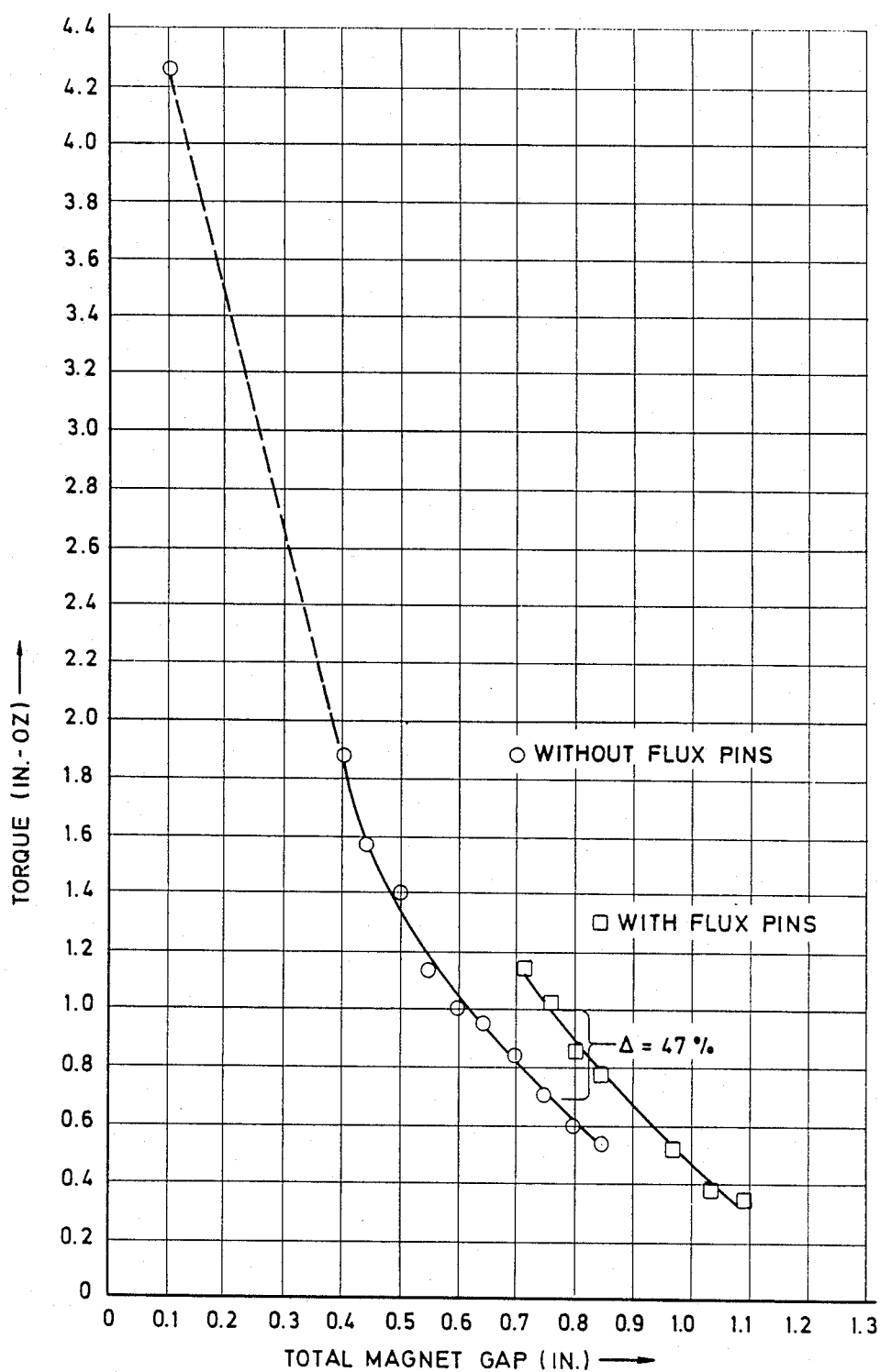
FIG. 5 is a graphical illustration showing the increase in transmitted torque afforded by the present invention.

With reference to the drawings, the new and improved magnetic drive coupling, and the method therefor according to the present invention, will be described. For illustrative purposes, FIGS. 1 and 2 show the bottom 11 of a bioreactor vessel 12 in which, due to the need to maintain a sterile system, shaft penetrations of the reactor vessel 12 are not allowed. To drive the internal mixer shaft 15, therefore, a face type magnetic drive 20 is used, driving the mixer shaft 15 through the non-magnetic end 11 of the reactor vessel 12. For this particular application, it is also required that the interior of the reactor vessel 12 must minimize crevices and dead volumes, and that a fluid conduit 23 must enter the vessel on the axis of rotation of the internal mixer shaft 15.

As will be clear from the drawings, however, a conduit such as a fluid conduit 23 will then have to pass through the same space in which the magnetic drive components are located. To avoid conflict between them, the driving magnet 30 must then be moved far enough away from the driven magnet 32 to allow the conduit 23 to pass therebetween. However, the resulting gap 35 between the driving magnet 30 and the driven magnet 32 can seriously reduce the magnetic coupling between the magnets 30 and 32, resulting in a major loss of performance of the magnetic drive 20.

The present invention overcomes these problems by providing a plurality of flux pins 40 in the gap 35. Pins 40, which are arranged in a non-rotating array, are pieces of soft magnetic material which reduce the reluctance of the air gap and concentrate the flux in the interface between the driving and driven magnets 30 and 32. This reduces the torque diminishing effect of the gap 35, enhances the torque transmitting capability of the magnetic drive coupling 20, and thereby compensates for the unusually large gap 35 therebetween. The flux pins 40 are separated from one another by non-magnetic material or air, so that they sequentially conduct the magnetic flux between the poles of the magnets 30 and 32 as they rotate. If the pins were not thus separated, the flux would be shunted.

As can also be seen in FIGS. 1 and 2, the spacing between two of the flux pins 40 is increased. This provides a clearance space 45 between those flux pins. The clearance space 45 then serves as a passageway in and through the gap 35 for passing components, such as conduit 23, therethrough. Preferably, space 45 is the smallest width which will allow the component to pass.

FIGS. 3 and 4 show a radial type magnetic drive 50 which is otherwise similar to the face type magnetic drive 20 illustrated in FIGS. 1 and 2. That is, in FIGS. 1 and 2 the driving and driven magnets 30 and 32 are axially aligned opposite one another, and the gap 35 is an axial gap therebetween. In FIGS. 3 and 4, the driving magnet 60 and driven magnet 62 are substantially coplanar and positioned radially opposite one another. The gap 65 between the driving magnet 60 and driven magnet 62 is accordingly a radial gap which furnishes room for a conduit 68 to pass therebetween. Flux pins 70 are also pieces of soft magnetic material for reducing the reluctance of the air gap 65 and concentrating the flux in the interface between the driving and driven magnets 60 and 62. This also reduces the torque diminishing effect of the gap 65, and enhances the torque transmitting capability of the magnetic drive coupling 50. The flux pins 70 are similarly separated from one another by non-magnetic material or air, so that they sequentially conduct the magnetic flux between the poles of the magnets 60 and 62 as they rotate.

As can also be seen in FIGS. 3 and 4, the spacing between two of the flux pins 70 is increased. This provides a clearance space 75 between those flux pins, and forms a passageway in and through the gap 65 for passing components, such as conduit 68, therethrough.

Finally, FIG. 5 shows the results of a test performed to measure the torque transmitting capability of a magnetic drive system according to the present invention. Commercially available samarium cobalt ($SmCo_5$) magnets were used at various magnet gaps, with and without flux pins. The test results showed that with flux pins the maximum torque that could be transmitted was increased by almost one half (47%) over that without flux pins for the same magnet gap.

As may be seen, therefore, the present invention provides numerous advantages. It provides an important new method and apparatus for extending the usefulness of magnetic drive couplings when relatively large gaps have to be tolerated because of other constraints. It is especially effective at reducing the reluctance of such gaps and concentrating the magnetic flux in the interface between the driving and driven members of the magnetic drive. This offsets the torque diminishing effects of such gaps and enhances the torque transmitting capabilities of the magnetic drive couplings. The invention thus furnishes an inexpensive, uncomplicated, durable, versatile, and reliable method and apparatus, inexpensive to manufacture, and readily suited to the widest possible utilizaton in magnetic drive applications.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A magnetic drive coupling, comprising:
   (a) a rotatable driving magnetic member.
   (b) a driven magnetic member rotatable on substantially the same axis as said driving member, said driven magnetic member being located substantially adjacent said driving member for magnetically and drivingly coupling therewith, and said magnetic members being separated by a predetermined gap therebetween,
   (c) a plurality of flux pins located in said gap between said driving and driven magnetic members to reduce the reluctance of said gap, concentrate the magnetic flux in the interface between said members, reduce the torque diminishing effect of said gap, and enhance the torque transmitting capability of the coupling, and
   (d) means providing at least one clearance space between a circumferentially adjacent pair of said flux pins to provide a passageway in said gap for passing components therethrough.

2. The coupling of claim 1 wherein said driving and driven magnetic members are a face drive substantially axially aligned opposite one another, and said gap is an axial gap therebetween.

3. The coupling of claim 1 wherein said driving and driven magnetic members are a substantially co-planar radial drive positioned radially opposite one another, and said gap is a radial gap therebetween.

4. The coupling of claim 1 further comprising a fluid conduit passing through said clearance space.

5. The coupling of claim 1 wherein said flux pins are made of soft magnetic material.

6. The coupling of claim 1 further comprising non-magnetic solid material separating said flux pins in said gap.

7. The coupling of claim 1 further comprising means fixing said flux pins in stationary positions in said gap.

8. A magnetic drive coupling, comprising:
   (a) a rotatable driving magnetic member,
   (b) a driven magnetic member substantially axially aligned opposite said driving member to form a face drive therewith, being rotatable on substantially the same axis as said driving member, and being located substantially adjacent said driving member for magnetically and drivingly coupling therewith, and said magnetic members being separated by a predetermined axial gap therebetween.
   (c) a plurality of flux pins made of soft magnetic material and located in said gap between said driving and driven magnetic members to reduce the reluctance of said gap, concentrate the magnetic flux in the interface between said members, reduce the torque diminishing effect of said gap, and enhance the torque transmitting capability of the coupling,
   (d) means providing a clearance space between a circumferentially adjacent pair of said flux pins to provide a passageway in said gap for passing components therethrough,
   (e) a fluid conduit passing through said clearance space, and
   (f) non-magnetic solid material separating and fixing said flux pins in stationary positions in said gap.

9. A magnetic drive coupling method, comprising:
   (a) locating a driven magnetic member rotatably on substantially the same axis as a rotatable driving magnetic member, and substantially adjacent the driving member, for magnetically and drivingly coupling therewith, the magnetic members being separated by a predetermined gap therebetween,
   (b) reducing the reluctance of the gap between the driving and driven magnetic members, concentrating the magnetic flux in the interface between the members, reducing the torque diminishing effect of the gap, and enhancing the torque transmitting capability of the coupling, by locating a plurality of flux pins in the gap between the driving and driven magnetic members, and
   (c) providing at least one clearance space between a circumferentially adjacent pair of the flux pins to provide a passageway in the gap for passing components therethrough.

10. The method of claim 9 wherein the driving and driven magnetic members are a face drive substantially axially aligned opposite one another, and the gap is an axial gap therebetween.

11. The method of claim 9 wherein the driving and driven magnetic members are a substantially co-planar radial drive positioned radially opposite one another, and the gap is a radial gap therebetween.

12. The method of claim 9 further comprsing passing a fluid conduit through the clearance space.

13. The method of claim 9 wherein the flux pins are made of soft magnetic material.

14. The method of claim 9 further comprising separating the flux pins in the gap with non-magnetic solid material.

15. The method of claim 9 further comprising fixing the flux pins in stationary positions in the gap.

16. A magnetic drive coupling method, comprising:
   (a) locating a driven rotatable magnetic member substantially axially aligned opposite a rotatable driving magnetic member to form a face drive therewith, the members being substantially adjacent and rotatable on substantially the same axis for magnetically and drivingly coupling together, and being separated by a predetermined axial gap therebetween,
   (b) reducing the reluctance of the gap between the driving and driven magnetic members, concentrating the magnetic flux in the interface between the members, reducing the torque diminishing effect of the gap, and enhancing the torque transmitting capability of the coupling, by locating a plurality of flux pins made of soft magnetic material in the gap between the driving and driven magnetic members,
   (c) providing a clearance space between a circumferentially adjacent pair of the flux pins to provide a passageway in the gap for passing a fluid conduit therethrough, and
   (d) separating and fixing the flux pins in stationary positions in the gap with non-magnetic solid material.

* * * * *